US012160145B2

United States Patent
Wesa et al.

(10) Patent No.: US 12,160,145 B2
(45) Date of Patent: Dec. 3, 2024

(54) DRIVE UNIT FOR AN ELECTRICALLY DRIVEN VEHICLE

(71) Applicant: ZF Friedrichshafen AG, Friedrichshafen (DE)

(72) Inventors: Matthias Wesa, Ravensburg (DE); Andreas Jung, Schlier (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 233 days.

(21) Appl. No.: 17/926,848

(22) PCT Filed: May 26, 2021

(86) PCT No.: PCT/EP2021/064040
§ 371 (c)(1),
(2) Date: Nov. 21, 2022

(87) PCT Pub. No.: WO2021/239807
PCT Pub. Date: Dec. 2, 2021

(65) Prior Publication Data
US 2023/0238861 A1   Jul. 27, 2023

(30) Foreign Application Priority Data

May 29, 2020   (DE) ..................... 10 2020 206 743.0

(51) Int. Cl.
*H02K 11/40*   (2016.01)
*H02K 5/173*   (2006.01)
(Continued)

(52) U.S. Cl.
CPC ........... *H02K 11/40* (2016.01); *H02K 5/1732* (2013.01); *H02K 7/003* (2013.01); *H02K 11/00* (2013.01); *H02K 11/0141* (2020.08)

(58) Field of Classification Search
CPC ...... H02K 11/40; H02K 5/1732; H02K 7/003; H02K 5/16; H02K 11/00; H02K 11/0094; H02K 11/014; H02K 11/0141
(Continued)

(56) References Cited

U.S. PATENT DOCUMENTS 8,183,727 B2   5/2012 Fee et al.
2002/0121821 A1   9/2002 Ritter
(Continued)

FOREIGN PATENT DOCUMENTS

DE   27 17 593 A1   10/1978
DE   35 11 755 A1   10/1985
(Continued)

OTHER PUBLICATIONS

Imai et al, Electromagnetic Noise Control Device for Electric Vehicle, Sep. 8, 2000, JP 2000244180 (English Machine Translation) (Year: 2000).*
(Continued)

*Primary Examiner* — Alexander A Singh
(74) *Attorney, Agent, or Firm* — Cozen O'Connor

(57) ABSTRACT

A drive unit for an electrically driven vehicle with an inverter module, an electric machine a stator which is controllable by the inverter module. The rotor of the electric machine rotationally drivingly communicates with at least one shaft of the drive unit, the shaft being rotatably supported in a respective associated housing by a bearing arrangement. The housing and the inverter module are grounded. Further, the drive unit has a grounded, low-impedance electrical connection between the shaft and the inverter module so that, when a potential difference occurs between the shaft and the inverter module, a short circuit is produced. Low-impedance potential equalizer is provided between the shaft and the associated housing. It is provided
(Continued)

that the shaft is formed as a rotor shaft or as a transmission shaft, the bearing arrangement has two bearings spaced apart axially from one another, and the potential equalizer is formed axially between the two bearings.

4 Claims, 2 Drawing Sheets

(51) Int. Cl.
*H02K 7/00* (2006.01)
*H02K 11/00* (2016.01)
*H02K 11/01* (2016.01)

(58) Field of Classification Search
USPC ....................................................... 310/68 R
See application file for complete search history.

(56) References Cited

U.S. PATENT DOCUMENTS

| | | | |
|---|---|---|---|
| 2004/0233592 A1 | 11/2004 | Oh et al. | |
| 2010/0127585 A1* | 5/2010 | Fee | H02K 11/40 310/71 |
| 2012/0112588 A1* | 5/2012 | Watanabe | H02K 11/40 310/90 |
| 2019/0109520 A1* | 4/2019 | van Bezooijen | H02K 7/003 |

FOREIGN PATENT DOCUMENTS

| | | | | |
|---|---|---|---|---|
| DE | 9416334 U1 | 5/1995 | | |
| DE | 10 2007 019 828 | 10/2008 | | |
| DE | 102007019828 B3 * | 10/2008 | ........... | H01R 39/383 |
| DE | 10 2008 039 577 | 4/2009 | | |
| DE | 10 2018 107 408 | 10/2019 | | |
| DE | 102018218813 | 5/2020 | | |
| EP | 3 465 889 A1 | 4/2019 | | |
| JP | 2000244180 A * | 9/2000 | | |
| JP | 2000310296 A | 11/2000 | | |
| JP | 2004173335 A | 6/2004 | | |

OTHER PUBLICATIONS

Liebel Manfred, Tapping Device for Tapping an Electrical Voltage from a Shaft of an Electric Machine, Oct. 9, 2008, DE 102007019828 (English Machine Translation) (Year: 2008).*

* cited by examiner

DRIVE UNIT FOR AN ELECTRICALLY DRIVEN VEHICLE

PRIORITY CLAIM

This is a U.S. national stage of application No. PCT/EP2021/064040. Priority is claimed on German Application No.: 10 2020 206 743.0, filed May 29, 2020, the content of which is incorporated herein by reference.

BACKGROUND OF THE INVENTION

The invention is directed to a drive unit for an electrically driven vehicle.

In inverter-controlled electric vehicle drives, an electric potential difference can occur for a variety of reasons between a driveshaft and an associated housing, particularly also between a rotor shaft and a housing of the electric machine, and this electric potential difference is reduced as a result of a discontinuous current flow or discontinuous discharge processes over a bearing arrangement of the driveshaft. On one hand, the steady reduction of potential differences often leads to bearing damage particularly of the rolling elements thereof and to a deterioration of and, ultimately, premature wear of the bearing arrangements. Unusual noises which impair driving comfort may also occur as an accompanying phenomenon. Further, the potential-carrying driveshafts can act as an electromagnetic dipole and emit stray RF signal noise in the environment of the vehicle. This stray noise acts as an interference signal and compromises the functionality of existing electronic vehicle equipment and can substantially impede radio reception on board the vehicle, for example.

With this in mind, it is suggested as a countermeasure in the generic DE 10 2008 039 577 B4 to provide a grounded, low-impedance connection between the transmission output shaft and the inverter module of the electric vehicle drive using a potential equalizing means which is designed to short circuit any voltage potential between the transmission output shaft and the inverter module. The low-impedance connection is not lubricated by a transmission fluid.

Further, US 2002/0121821 A1 suggests a seal or a bushing conductively contacting the motor shaft and motor housing to remove unwanted shaft voltages of a motor or generator. Other low-impedance devices for reducing electric potential differences between a rotating shaft and a housing surrounding the latter are known, for example, from US 2004/0233592 A1, DE 27 17 593 A1, DE 35 11 755 A1, DE 9416334 U1, JP 2004173335 A and JP 2000310296 A.

When applying one of the above-mentioned solutions, it has turned out that a bearing spatially adjacent to the potential-carrying driveshaft can be well-protected against such shaft voltages. However, it is perceived as disadvantageous that bearing damage and an interfering stray RF signal noise can still occur to a limited extent in a conventional bearing arrangement of a driveshaft with at least two bearings spaced axially apart from one another. While such low-impedance potential equalizing means formed on both axial sides would be possible in practice, this would lead to increased production costs, assembly costs and outlay and is therefore not a preferable remedy.

SUMMARY OF THE INVENTION

In view of the foregoing, the invention has the object of further improving a generic drive unit for an electrically driven vehicle in an economical manner and eliminating or at least reducing the disadvantageous effects mentioned above.

The above-stated object is met by a drive unit having a low-impedance potential equalizing means provided between a shaft of the drive unit and an associated housing be formed axially between two bearings spaced apart from one another along the shaft. In this regard, the above-mentioned shaft of the drive unit can be a rotor shaft or a transmission shaft which can be acted upon by an electric potential during the operation of the electric machine as a result of various influences and can reduce a potential difference relative to the associated housing.

The insight underlying the invention consists in that the potential difference occurring between stator and rotor and the elements of the drive which are conductively connected to the latter is not constant axially along the rotor shaft or a shaft operatively connected thereto but, on the contrary, varies in this direction. The inventors have concluded from this that the efficiency of the low-impedance potential equalizing means is decisively influenced by its axial position on the electrically conducting shaft. In particular, the impedance of the potential equalizing means should be lower than the impedance of a bearing supporting the shaft and also lower than the impedance of a gear unit which is formed between two shafts by means of toothed wheels and which likewise constitutes possible current paths for reducing the potential difference.

In the suggested drive unit for a purely electric vehicle or a hybrid vehicle, the electric machine can preferably be constructed as a brushless machine, particularly as a reluctance machine, asynchronous machine or permanently excited synchronous machine. In this regard, the stator comprises a stator winding which is acted upon by the inverter with a voltage with variable frequency and amplitude.

The rotor of the electric machine usually comprises an electromagnetically active rotor component which is secured to the rotor shaft and which generates a torque of the electric machine in cooperation with the stator. In the present instance in particular, this active rotor component is dual supported and is formed axially between the two bearings. An effective protection of the two bearings can be achieved when the potential equalizing means are arranged axially within the extension of the active rotor component. The bearings can be provided axially substantially level with the front sides of the active rotor component or can be arranged at one or both front sides thereof farther away from the active rotor component. For example, depending on the principle of operation of the electric machine, the active rotor component can take the form of a coil-free fluted lamination stack as is conventional in the field, a squirrel cage rotor, a permanently excited rotor or other conventional construction.

The effect of the potential equalizing means can be optimized in that they are formed substantially midway between the two bearings, particularly when the impedance of the bearings located axially on both sides is comparable.

The low-impedance potential equalizing means can be realized in a variety of known ways in principle, e.g., as a brush connecter. According to an advantageous embodiment, the potential equalizing means can be formed as a sliding ring or slip ring arrangement with two rings in mutual contact with one another. In this regard, one of the rings can be arranged on the rotor shaft or transmission shaft, and the other ring can be arranged on an electrically conductive element which is secured to and electrically connected with the associated or adjacent metal, electrically conductive housing.

According to an embodiment form, the potential equalizing means can be arranged radially inside of the rotor shaft or the output shaft. The rotor shaft or the output shaft can be constructed as a hollow shaft, the conductive element being secured axially at the end side to the adjacent or associated housing and extending axially inside of the hollow shaft. In this way, an occurring potential difference can be reduced by means of a simple construction without adding to the required installation space.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described in the following with reference to an exemplary embodiment form shown in the figures. The drawings show.

DETAILED DESCRIPTION OF THE PRESENTLY PREFERRED EMBODIMENTS

Figure 1:
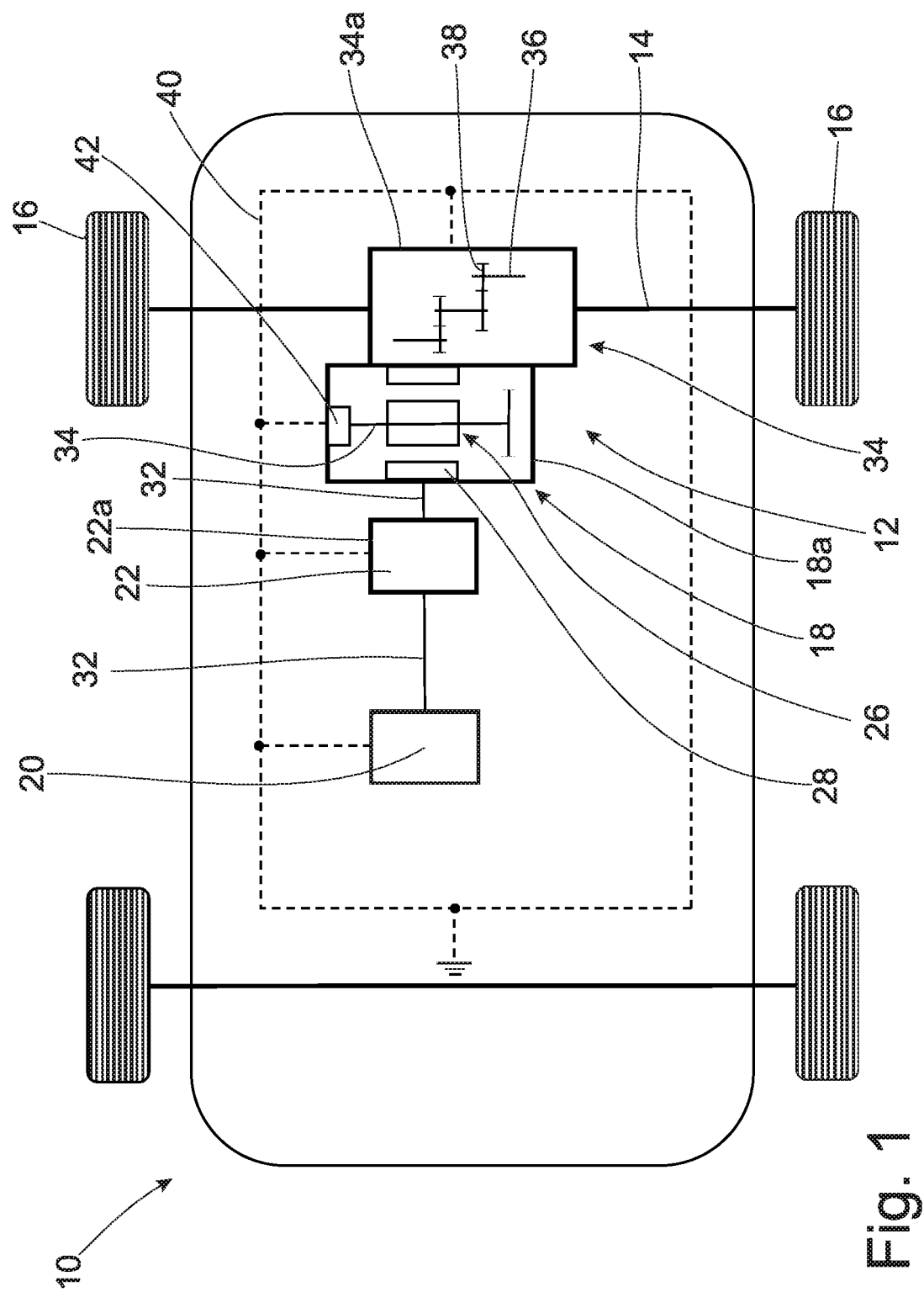
FIG. 1 a schematic view of an electric vehicle with a drive unit.

FIG. 1 schematically shows an electric vehicle 10 with a drive unit 12 which in this instance comprises an electric machine 18 acting on a wheel driveshaft 14 and vehicle wheels 16. The electric machine 18 is formed as a brushless, asynchronous type construction and is supplied with electrical energy by an energy storage 20 via an inverter module 22. The electric machine 18 comprises a rotor 26 which is secured to a rotor shaft 24 and a stator 28 with a multi-phase stator winding 30 which is connected to the inverter module 22 and the energy storage 20 by means of power supply cables 32. Further, a gear unit arrangement 34 with transmission shafts 36 and toothed wheels 38 is provided between the rotor 26 and the wheel driveshaft 14, as a result of which the output delivered by the rotor 26 in a desired rotational speed and a required drive torque can be adapted to an existing vehicle drive requirement. The electric machine 18, the inverter module 22 and the gear unit arrangement 34 each have an electrically conductive housing, i.e., a machine housing 18a, an inverter module housing 22a and a gear unit housing 34a, comprising a metal material such as aluminum or a cast iron material, are electrically interconnected and are grounded in common to the vehicle via an electric line in the form of a ground line 40 which connects them or via the electrically conductive vehicle chassis; that is, the aforementioned components are at the same electric potential.

Figure 2:
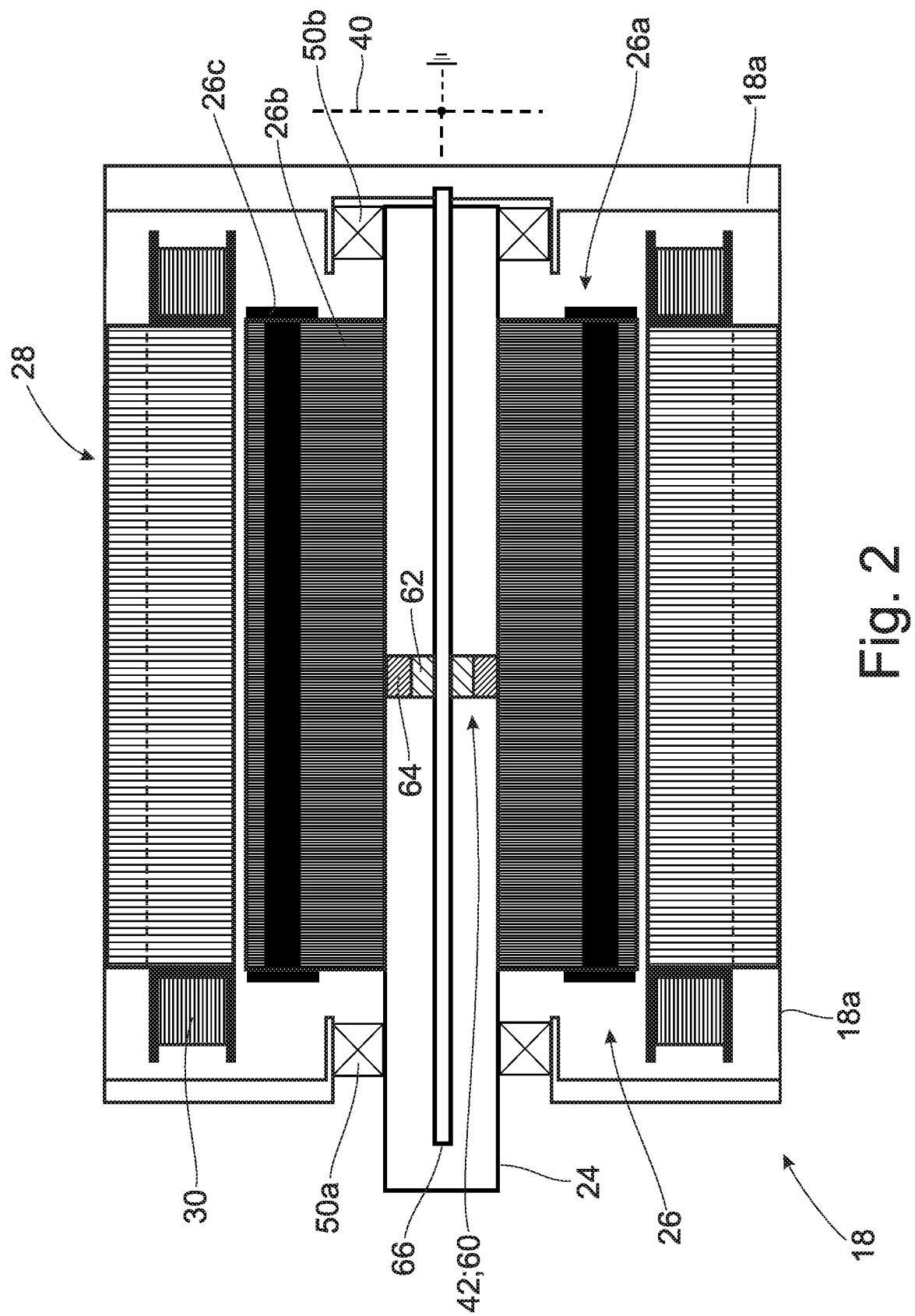
FIG. 2 a schematic view of an electric machine of the drive unit from FIG. 1.

FIG. 2 shows a schematic view of the electric machine 18 in which low-impedance potential equalizing means 42 are provided between the rotor shaft 24 and the machine housing 18a so that, when a potential difference occurs between the rotor shaft 24 and the machine housing 18a, a short-circuit current is produced which reduces the existing potential difference. Due to the presence of the low-impedance potential equalizing means 42, the magnitude of the possible potential difference can be limited and this potential difference can be reduced directly and persistently, i.e., substantially continuously. Accordingly, the current flow can be selectively returned to the source of the potential difference, i.e., particularly to the inverter module 22 and the electric machine 18, via the potential equalizing means 42 and the ground line 40.

It can be seen from FIG. 2 that the rotor 26 comprises an electromagnetically active rotor component 26a which is arranged at the rotor shaft 24 and has the form of a lamination stack 26b with a squirrel cage winding 26c and that the rotor shaft 24 is rotatably supported in the machine housing 18a by means of a bearing arrangement 50 comprising two bearings 50a, b, particularly rolling element bearings, which are spaced apart from one another axially. The active component 26a is formed axially between the two bearings 50a,b. As will further be seen, the potential equalizing means 42 are arranged axially between the two bearings 50a,b and, in the present instance, also axially within the extension of the active rotor component. In particular, the potential equalizing means 42 are arranged substantially midway between the two bearings 50a,b. As a result of this arrangement, which is at least substantially symmetrical in this case, an occurring potential difference can largely be reduced via the potential equalizing means 42. While a potential difference can also occur at the bearings 50a,b which are spaced apart axially on both sides from the potential equalizing means 42, a current flow passing through each of these bearings is appreciably less pronounced and is therefore less damaging for each of these bearings 50a,b.

In the embodiment example under discussion, the potential equalizing means 42 are formed radially inside of the rotor shaft 24 as a slip ring arrangement 60 with two rings 62, 64 in mutual slipping contact or sliding contact with one another. To this end, the ring 64 is inserted inside of the rotor shaft 24 in the form of a metal hollow shaft and is electrically conductively arranged at the latter. The other ring 62 is arranged radially inside of ring 64 and secured to a rod-shaped, electrically conductive element 66 which is axially secured at the end side to the machine housing 18a and which extends axially inside of the hollow shaft 24. The rings 62, 64 are in mutual sliding contact with their surface areas that face one another such that a favorable passage of current through their opposing interfaces. Ring 64 rotates with the rotor shaft 24 and ring 62 is stationary relative to the latter. The rings 62, 64 are formed from a material with good electric conductivity, for example, a copper material. In order to increase resistance to wear resulting from rotation relative to one another, the rings 62, 64 can have a wear-reducing coating. As a result of this arrangement, when a potential difference occurs, a short circuit flow can propagate from the rotor shaft 24, via the slip ring arrangement 60, element 66, machine housing 18a and ground line 40 to the inverter module 22. If necessary, the provided potential equalizing means 42 can be lubricated with a conductive fluid while retaining the required low impedance. In principle, the low-impedance potential equalizing means 42 can also formed dry, i.e., without a lubricant being present. The conductive element 66 mentioned above can be formed as a cooling lance of a cooling arrangement of the rotor 26 as is shown and described in principle, for example, in German Patent Application 102018218813.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A unit for an electrically driven vehicle comprising:
   an inverter module,
   an electric machine with a rotor and with a stator which is controllable by the inverter module, wherein the rotor rotationally drivingly communicates with at least one shaft of the drive unit, and wherein the shaft is rotatably supported in a respective associated housing by a bearing arrangement, and
   wherein the housing and the inverter module are grounded, and
   wherein the drive unit has a grounded, low-impedance electrical connection between the shaft of the drive unit and the inverter module so that, when a potential difference occurs between the shaft and the inverter module, a short circuit is produced, wherein low-impedance potential equalizing means are provided between the shaft and the associated housing, and
   wherein the shaft is formed as a rotor shaft or as a transmission shaft,
   wherein the bearing arrangement has two bearings spaced apart axially from one another, and
   wherein the potential equalizing means are formed axially between the two bearings, and
   wherein the rotor comprises an electromagnetically active rotor component which is secured to the rotor shaft and which is formed axially between the two bearings, and wherein the potential equalizing means are arranged axially within the extension of the active rotor component.

2. The drive unit according to claim 1, wherein the potential equalizing means are formed substantially midway between the two bearings.

3. The drive unit according to claim 1, wherein the potential equalizing means are formed as a sliding ring arrangement or slip ring arrangement with two rings in mutual contact with one another, wherein one of the rings is arranged on the rotor shaft or transmission shaft, and the other ring is arranged on a conductive element which is secured to and electrically connected with the respective associated housing.

4. The drive unit according to claim 3, wherein the potential equalizing means are arranged radially inside of the rotor shaft or the transmission shaft, wherein the rotor shaft or the transmission shaft is constructed as a hollow shaft, and wherein the conductive element is secured axially at the end side to the adjacent or associated housing and extends axially inside of the hollow shaft.

* * * * *